Feb. 3, 1959 P. J. BERNER 2,872,539
STEERING WHEEL
Filed July 12, 1956 2 Sheets-Sheet 1
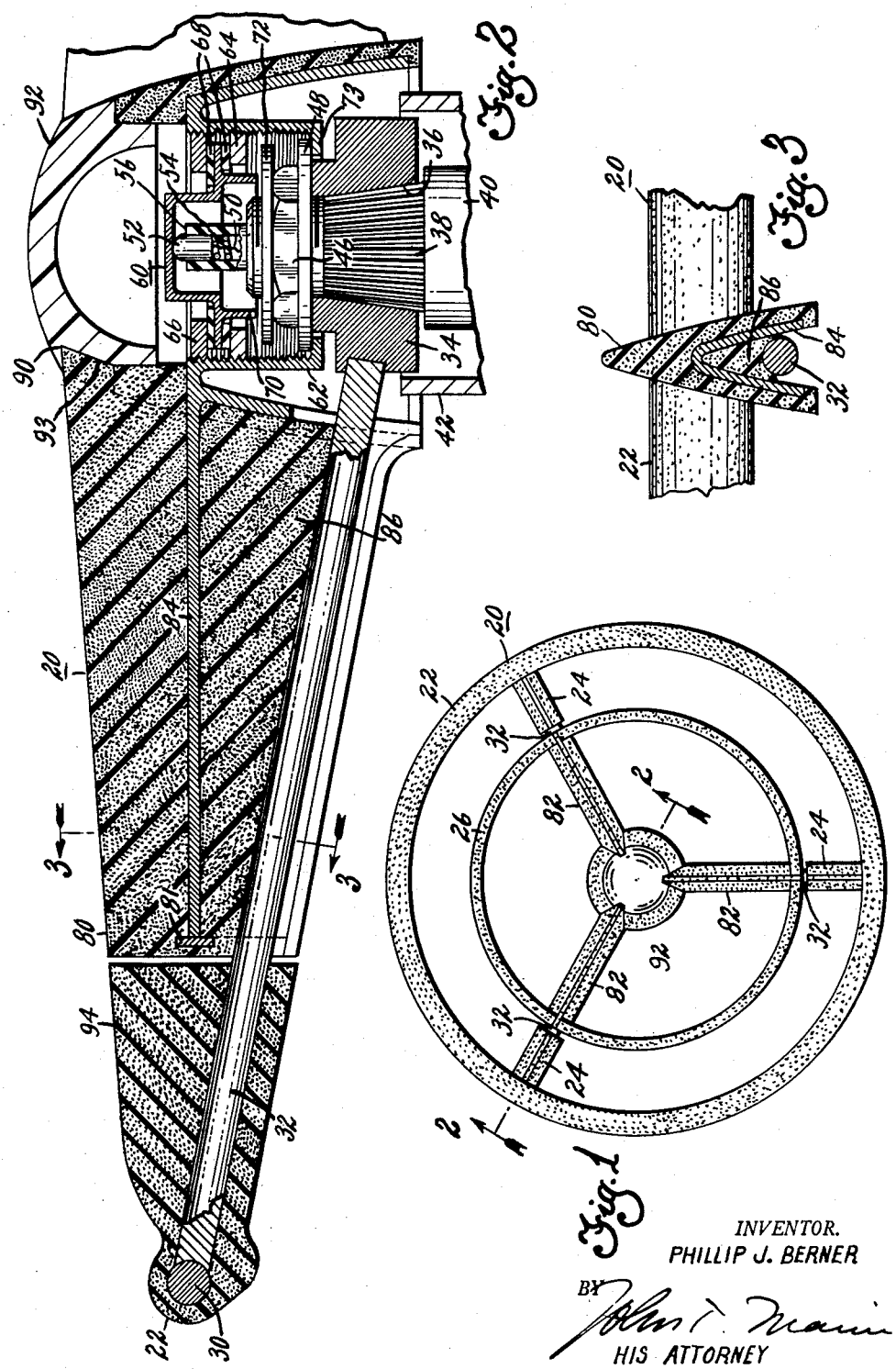
INVENTOR.
PHILLIP J. BERNER
BY
HIS ATTORNEY Feb. 3, 1959 P. J. BERNER 2,872,539
STEERING WHEEL
Filed July 12, 1956 2 Sheets-Sheet 2
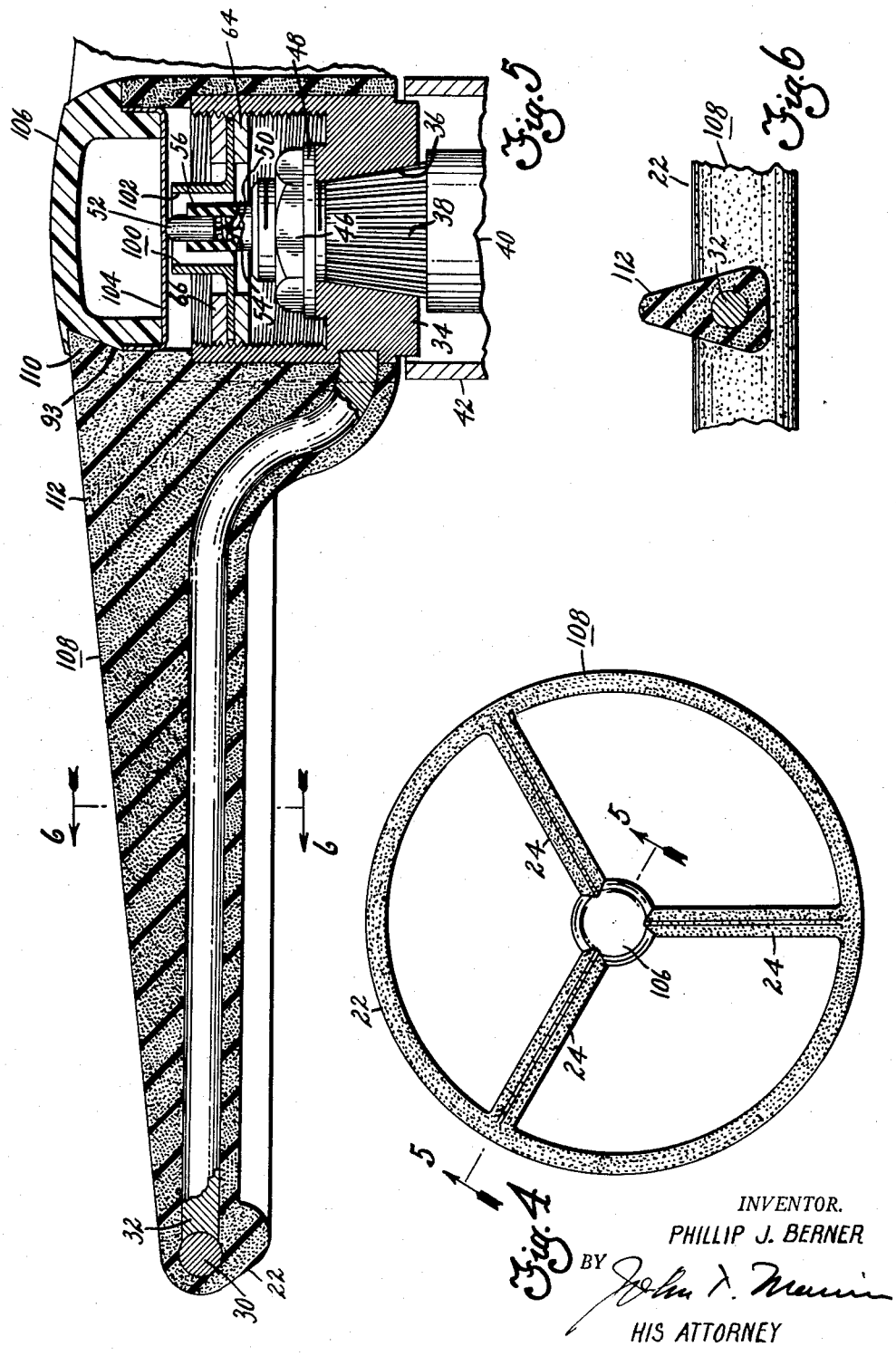
INVENTOR.
PHILLIP J. BERNER
BY
HIS ATTORNEY

2,872,539

STEERING WHEEL

Phillip J. Berner, Dayton, Ohio, assignor to General Motors Corporation, Detroit, Mich., a corporation of Delaware Application July 12, 1956, Serial No. 597,452

4 Claims. (Cl. 200—61.56)

This invention relates to a steering wheel and is particularly concerned with a safety type steering wheel including a resilient covering thereover.

It is the main object of the invention to provide a safety steering wheel including a soft rubber covering coextensively enveloping the metal parts of the wheel wherein the wheel includes a horn blowing mechanism which mechanism cooperates with portions of the soft rubber covering to operate the horn. In carrying out this object, it is a further object to use portions of the soft rubber covering on the wheel as a resilient means for maintaining the horn blowing switch in open circuit position and against which compressive forces may be applied for closing the switch.

Further objects and advantages of the present invention will be apparent from the following description, reference being had to the accompanying drawings wherein preferred embodiments of the present invention are clearly shown.

In the drawings:

Figure 1 is a plan view of a steering wheel utilizing a horn blowing ring.

Figure 2 is a section taken on line 2—2 of Figure 1.

Figure 3 is a section taken on line 3—3 of Figure 2.

Figure 4 is a plan view of a conventional steering wheel utilizing a horn button without a horn blowing ring.

Figure 5 is a section taken on line 5—5 of Figure 4.

Figure 6 is a section taken on line 6—6 of Figure 5.

Soft rubber coverings for steering wheels are not new. In this connection, attention is directed to the Geyer Patent 1,943,915, issued January 16, 1934, which discloses a steering wheel in which the spoke, hub and rim portion thereof are covered with soft rubber for the specific purpose of minimizing injury to the driver's body when hurled against the wheel due to a sudden stop of the vehicle. In the Geyer patent, this covering was coextensively disposed around the steel spider which forms the rim and hub of the conventional wheel and which is normally covered with either hard rubber or plastic.

The present invention is directed to improvements in safety steering wheels wherein a steel spider reinforcement is utilized and wherein a relatively thick soft rubber and preferably sponge rubber covering is disposed over the steel parts for forming a relatively soft cushion which is resilient to the touch and which minimizes the change of injury if the driver is thrown against the wheel.

Another purpose for the soft rubber covering, as will be described in detail hereinafter, is to act as a resilient means in cooperation with the horn blowing mechanism and thereby displace springs or other resilient members heretofore used in connection with the horn blowing mechanism.

Referring to the drawings, and specifically to Figure 1, a steering wheel is shown at 20 which includes a rim 22, a plurality of spokes 24. The wheel 20 is reinforced by means of an annular steel ring 30 having welded thereto a plurality of steel spokes 32 which are suitably attached to a steel hub member 34. Molded over the ring 30, spokes 32 and hub 34 is a coextensive rubber covering to be described hereinafter. The hub 34 is apertured and splined at 36 to fit over the splined end 38 of a steering column 40 which is preferably enclosed in a mast jacket 42. The hub 34 is held to the steering column 40 by means of a nut 46 and having a washer 48 interposed between it and the hub 34. Through the steering column 40 passes a conductor 50 terminating in a brush 52 pressed upwardly by spring 54 which brush and spring are carried within an insulated bushing 56 pressed in the outermost end of the steering column 40. The brush 52 is used as a current carrying means to a shell 60 contact which is held within a hub 62 of a horn blowing ring 26. The shell contact 60 is adjustably positioned by means of two nuts 64 and 66 having insulating washers 68 interposed therebetween so that the shell 60 is insulated from the hub 62 but adjustably disposed therein so as to properly contact the brush 52. Thus, the shell 60 is "live." The lower end of shell 60 includes a depending skirt 70. The shell 60 is adjusted so the skirt 70 is spaced from the washer 72 which is secured on top of nut 46 on the steering column 40 by a lock ring or other suitable means, not shown, or which may be threaded onto the end of the column. Since the washer 72 and steering column 40 are grounded and one side of the battery is grounded while the other side of the battery is connected to the brush 52, it is apparent that the shell 60 in conjunction with the washer 72 will form a switch which, when the two parts are contacted, will close a circuit to a suitably connected horn. An inwardly turned flange 73 on hub 62 is disposed between the washer 48 and the wheel hub 34 to maintain the assembly of parts and to limit movement of the horn blowing ring in either direction.

The horn blowing ring 26 has a soft sponge rubber covering all over the upper portions thereof as shown at 80 which covers not only the ring portion 81 but also the spoke portions 82 thereof which spoke portions have reinforcements 84 embedded therein. The reinforcement members 84 are of channel-like cross section, as shown in Figure 3, and include a considerable depth of sponge rubber 80 thereover. It is also important in this connection to provide sponge rubber in the inner surfaces of the spoke channels 84 as shown at 86 in Figure 3. This sponge rubber, when the horn ring 26 is assembled to the wheel 20, rests resiliently upon the spokes 32, as shown in Figure 3, and acts as the yieldable means for keeping the skirt 70 of shell 60 out of contact with the washer 72 to keep the horn circuit open. When the horn blowing ring is depressed by pressure applied to the upper portions thereof, the sponge rubber filler 86 compresses against spokes 32 to permit the skirt 70 to contact the washer which closes the horn circuit. When pressure is relieved, the resilient character of the filler 86 returns the horn ring to its original position, breaking the circuit.

At the center of the horn ring, the covering 80 on the spoke portions 84 terminates with an inwardly inclined section noted at 90. An ornamental horn button 92 including three spaced grooves 93 therein around the outer periphery is provided which grooves accommodate the overlapping portions of the sponge rubber covering 80 as designated at 90. Thus, the horn button can be snapped into place and held by the inherent resiliency of the rubber material at the portions 90. This horn button may be flat, depressed or extend outwardly as shown. It may be made of plastic, rubber or metal and it may or may not be covered with sponge rubber, as desired. It is basically of an ornamental character to close the opening in the center of the horn blowing ring which is required to properly adjust the horn blowing mechanism.

It will be noted that the rubber material 80 on the horn blowing ring is aligned with the heavy sponge rubber covering 94 at the junction of the spokes 32 and rim 30 of the wheel 20 which covering 94 is coextensive with the covering of sponge rubber which envelops the rim 30. Thus, all portions of the wheel are soft to the touch and provide a high safety factor in the use of the wheel.

Figures 4 through 6 show another modification of the invention where no horn blowing ring is used. In this connection, a shell 100 is provided within the hub of the wheel which shell has an upstanding skirt 102 which is apertured to permit the brush 52 to pass therethrough. The skirt terminates a short distance below a metal plate 104 carried by a horn button 106. The horn button 106 is attached to a wheel 108 in the same manner as described in connection with the horn button 92 shown in Figure 2, namely, by overhanging portions 110 of rubber-like material covering the spokes. The horn button 106 includes the three spaced grooves therearound which permit the rubber-like material 112 to interlock with the cap or button 106 to hold it in place. Here again, the inherent resiliency of covering material 112 on the spokes of the wheel is used as the resilient means for actuating the horn blowing switch and, when the horn button is depressed, the covering 112 is compressed to permit closing of the circuit by means of contacting the plate 104 with the skirt 102. Therefore, in each instance, the inherent resiliency of the safety covering for a portion of the wheel is used as the yieldable means for operating the horn switch.

While the terms rubber and sponge rubber have been used throughout the specification, it is to be understood that the covering for the wheel may be any elastomeric material which is of a highly resilient character and preferably spongy. Such materials may be produced from natural rubber, butadiene styrene copolymers, butadiene acrylonitrile copolymers, polychloroprene, polyisoprene, vinyl materials, polyisocyanate, compatible mixtures thereof, etc., as are well known in the art may be used and the particular material forms no part of this invention. Furthermore, the material used in the resilient spongy rubber covering of the wheel, spokes and horn rim may have a skin covering formed by means of lacquers, other elastomeric materials disposed within the mold to form covering sheaths, etc., or it may be left "as is" without an applied skin. In other words, the specific covering is of little importance except that it must be highly resilient for safety purposes and have the added function of acting as a yieldable means for operating the horn switch.

In all cases, the specific design of the wheel and the horn blowing ring and the depth of covering of the elastomeric material are matters of choice, the only limiting factor being that sufficient covering material is provided on the wheel and spokes, etc., to act as a safeguard to prevent injury to the operator of the vehicle in case of an accident. It is also understood that the horn button in all cases may be of any desired design and may also include sponge rubber coverings thereover or may be clear plastic, decorated plastic or metal.

While the embodiments of the present invention as herein disclosed constitute preferred forms, it is to be understood that other forms might be adopted.

What is claimed is as follows:

1. A safety steering wheel assembly comprising in combination: a rim, hub and connecting spokes, a horn blowing ring having portions of channel-like cross section in register with and at least partially covering said spokes, said portions terminating at their inner ends in a ring-like hub, a soft elastomeric covering for said horn ring and including cushions of said elastomer extending within and partially filling said channel-like portions and adapted to rest on said spokes, means for interlocking the horn blowing ring to said wheel hub, and a horn blowing switch carried within said ring hub, said switch being so dimensioned that it is held in open circuit position solely by said cushions and may be close circuited through pressure applied to the ring for depressing said cushions.

2. The structure as claimed in claim 1 wherein the covering for said horn ring spokes extends beyond the spoke junction with the hub forming a plurality of resilient interlocks, and a horn button for closing said ring hub and adapted to be resiliently held thereto solely by the action of said interlocks and horn button.

3. A wheel comprising in combination: a rim and hub therefor, said rim and an annular hub being connected by spokes, a resilient elastomeric covering for said spokes and presenting relatively thick cushions at the top surfaces thereof, said cushions extending beyond the junctions of the spokes with the hub, a horn button for closing the hub, said button including grooves positioned axially thereof at the outer periphery and adapted to pass over end portions of said extending cushions for indexing the button with respect to the wheel, the remainder of said extending portions of elastomeric cushioning material interlocking said horn button to the hub, and a horn switch carried within the hub in normally open circuit position, said horn switch adapted to be closed by pressure applied on said button whereby the button deforms the cushioning material to act as a spring therefor for returning the horn button to normal position and the switch to open circuit position when the pressure is relieved.

4. A steering wheel assembly, comprising in combination: a wheel including a rim portion, a hub portion, and connecting spoke portions, highly resilient elastomeric material covering said entire wheel and having substantially greater thickness of elastomeric material at the upper surfaces of the rim, hub and spoke portions whereby a highly resilient cushioning material is provided at said portions, a horn button resting on portions of said relatively thick elastomeric covering and adapted to actuate a switch, said elastomeric covering acting as the sole resilient means for returning the horn button to position after it is depressed.

References Cited in the file of this patent

UNITED STATES PATENTS

| 1,943,915 | Geyer | Jan. 16, 1934 |
| 1,959,683 | Mitchell | May 22, 1934 |
| 2,070,760 | Straith | Feb. 16, 1937 |
| 2,090,322 | Batey | Aug. 17, 1937 |
| 2,127,323 | Breer | Aug. 16, 1938 |
| 2,181,783 | Creson | Nov. 28, 1939 |
| 2,215,677 | Walker | Sept. 24, 1940 |

FOREIGN PATENTS

| 486,633 | Germany | Nov. 21, 1929 |